US012332795B2

(12) United States Patent
Boyer et al.

(10) Patent No.: US 12,332,795 B2
(45) Date of Patent: Jun. 17, 2025

(54) REDUCING PROBE FILTER ACCESSES FOR PROCESSING IN MEMORY REQUESTS

(71) Applicant: Advanced Micro Devices, Inc., Santa Clara, CA (US)

(72) Inventors: Michael Warren Boyer, Bellevue, WA (US); Johnathan Alsop, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 3 days.

(21) Appl. No.: 17/719,225

(22) Filed: Apr. 12, 2022

(65) Prior Publication Data

US 2023/0325317 A1 Oct. 12, 2023

(51) Int. Cl.
*G06F 12/0817* (2016.01)
(52) U.S. Cl.
CPC .... *G06F 12/0828* (2013.01); *G06F 2212/621* (2013.01)
(58) Field of Classification Search
CPC .............. G06F 12/0828; G06F 2212/621
See application file for complete search history.

(56) References Cited

U.S. PATENT DOCUMENTS

| | | | |
|---|---|---|---|
| 5,303,362 A | 4/1994 | Butts, Jr. et al. |
| 5,412,788 A | 5/1995 | Collins et al. |
| 5,517,494 A | 5/1996 | Green |
| 5,537,575 A | 7/1996 | Foley et al. |
| 5,560,038 A | 9/1996 | Haddock |
| 5,659,708 A | 8/1997 | Arimilli et al. |
| 5,673,413 A | 9/1997 | Deshpande et al. |
| 5,684,977 A | 11/1997 | Van Loo et al. |
| 5,749,095 A | 5/1998 | Hagersten |
| 5,859,983 A | 1/1999 | Heller et al. |
| 5,878,268 A | 3/1999 | Hagersten |
| 5,887,138 A | 3/1999 | Hagersten et al. |
| 5,893,144 A | 4/1999 | Wood et al. |
| 5,924,118 A | 7/1999 | Arimilli et al. |
| 5,966,729 A | 10/1999 | Phelps |

(Continued)

OTHER PUBLICATIONS

Cantin et al, "Coarse-Grain Coherence Tracking: RegionScout and Region Coherence Arrays", IEEE Micro, Jan. 2006, vol. 26, Issue 1, pp. 70-79.

*Primary Examiner* — Baboucarr Faal
(74) *Attorney, Agent, or Firm* — Kowert, Hood, Munyon, Rankin & Goetzel, P.C.; Rory D. Rankin

(57) ABSTRACT

Systems, apparatuses, and methods for reducing probe filter accesses in response to processing-in-memory (PIM) requests are disclosed. A coherent secondary unit receives PIM requests targeting a corresponding PIM device. For each PIM request that is received, the coherent secondary unit performs a lookup of a PIM address table (PAT). If the address of the PIM request matches an address of an existing entry in the PAT, the coherent secondary unit prevents the PIM request from being sent to a probe filter. Otherwise, if there is no match for the address of the PIM request in the entries of the PAT, the coherent secondary unit sends the PIM request to the probe filter, and the coherent secondary unit creates a new PAT entry for the address of the PIM request. Any subsequent PIM requests to the same address will match with the new entry in the PAT.

20 Claims, 9 Drawing Sheets

(56) References Cited

U.S. PATENT DOCUMENTS

| | | | |
|---|---|---|---|
| 5,987,544 A | 11/1999 | Bannon et al. | |
| 5,991,819 A | 11/1999 | Young | |
| 6,012,127 A | 1/2000 | McDonald et al. | |
| 6,018,791 A | 1/2000 | Arimilli et al. | |
| 6,038,644 A | 3/2000 | Irie et al. | |
| 6,049,851 A | 4/2000 | Bryg et al. | |
| 6,070,231 A | 5/2000 | Ottinger | |
| 6,085,263 A | 7/2000 | Sharma et al. | |
| 6,098,115 A | 8/2000 | Eberhard et al. | |
| 6,101,420 A | 8/2000 | VanDoren et al. | |
| 6,108,737 A | 8/2000 | Sharma et al. | |
| 6,108,752 A | 8/2000 | VanDoren et al. | |
| 6,112,281 A | 8/2000 | Bamford et al. | |
| 6,138,218 A | 10/2000 | Arimilli et al. | |
| 6,199,153 B1 | 3/2001 | Razdan et al. | |
| 6,209,065 B1 | 3/2001 | Van Doren et al. | |
| 6,249,846 B1 | 6/2001 | Van Doren et al. | |
| 6,275,905 B1 | 8/2001 | Keller et al. | |
| 6,286,090 B1 | 9/2001 | Steely, Jr. et al. | |
| 6,292,705 B1 | 9/2001 | Wang et al. | |
| 6,295,583 B1 | 9/2001 | Razdan et al. | |
| 6,370,621 B1 | 4/2002 | Keller | |
| 6,535,489 B1 | 3/2003 | Merchant et al. | |
| 6,631,401 B1 | 10/2003 | Keller et al. | |
| 7,058,053 B1 | 6/2006 | Schober | |
| 7,237,016 B1 | 6/2007 | Schober | |
| 7,627,722 B2 | 12/2009 | Alsup | |
| 8,812,786 B2 | 8/2014 | Beckmann et al. | |
| 2002/0009095 A1 | 1/2002 | Van Doren et al. | |
| 2003/0088694 A1 | 5/2003 | Patek et al. | |
| 2004/0114737 A1 | 6/2004 | MacConnell | |
| 2005/0152332 A1 | 7/2005 | Hannum et al. | |
| 2007/0168600 A1 | 7/2007 | Anthony, Jr. et al. | |
| 2008/0016254 A1 | 1/2008 | Kruger et al. | |
| 2011/0296115 A1* | 12/2011 | Speight | G06F 12/0831 711/146 |
| 2014/0115137 A1 | 4/2014 | Keisam | |
| 2016/0117248 A1 | 4/2016 | Morton et al. | |
| 2017/0262369 A1* | 9/2017 | Murphy | G06F 12/084 |
| 2018/0165199 A1* | 6/2018 | Brandt | G06F 9/30043 |
| 2018/0302410 A1 | 10/2018 | Venkataraman et al. | |
| 2019/0043558 A1* | 2/2019 | Suh | G11C 7/1006 |
| 2020/0099993 A1 | 3/2020 | Kalyanasundharam et al. | |
| 2022/0188233 A1* | 6/2022 | Kalamatianos | G06F 12/0815 |

\* cited by examiner

REDUCING PROBE FILTER ACCESSES FOR PROCESSING IN MEMORY REQUESTS

BACKGROUND

Description of the Related Art

Computer systems use main memory that is typically formed with inexpensive and high density dynamic random access memory (DRAM) chips which suffer from relatively long access times. To improve performance, data processors typically include at least one local, high-speed memory known as a cache. In a multi-core data processor, each data processor core can have its own dedicated level one (L1) cache, while other caches (e.g., level two (L2), level three (L3)) are shared by data processor cores. Other types of multi-node computer systems can have caches that are arranged in various hierarchical structures.

Cache subsystems in a computing system include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some implementations, a block may also be the unit of allocation and deallocation in a cache. The number of bytes in a block is varied according to design choice, and can be of any size.

In multi-node computer systems, special precautions are taken to maintain coherency of data that is being used by different processing nodes. For example, if a processor attempts to access data at a certain memory address, it must first determine whether the data is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Computer systems are incorporating more complex memory devices, as well as large numbers and diverse types of memory devices, to cope with ever increasing data storage and performance requirements. For these computer systems, probe filters are often distributed and used to track the cache status of data for a particular memory range. When an access targeting data of a corresponding memory range is received by a given probe filter, the given probe filter will generate probes which are sent to the different cache subsystems to determine the status of the targeted data. In many modern computer systems, processing-in-memory (PIM) devices are being utilized to add processing in or near to the actual memory devices. Incorporating PIM capabilities in the memory of processors and accelerator products can improve performance and energy efficiency for a range of compute workloads. However, adding PIM capabilities can complicate efforts to maintain the cache coherency protocol. For example, a single PIM request can touch data from many cache lines, which means that one coherent PIM request will trigger many expensive probe filter accesses to determine the status of these multiple cache lines. It is noted that the term "touch" is defined as to access or target data in a particular location or at a particular address.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for reducing probe filter accesses in response to processing-in-memory (PIM) requests are disclosed herein. In one implementation, a coherent secondary unit receives PIM requests targeting a corresponding PIM device. For each PIM request that is received, the coherent secondary unit performs a lookup of a PIM address table (PAT). If the address targeted by the PIM request matches an address of an existing entry in the PAT, the coherent secondary unit prevents the PIM request from being sent to a probe filter. Otherwise, if there is no match for the address of the PIM request in the entries of the PAT, the coherent secondary unit sends the PIM request to the probe filter, and the coherent secondary unit creates a new PAT entry for the address of the PIM request. Any subsequent PIM requests to the same address will match with the new entry in the PAT.

Figure 1:
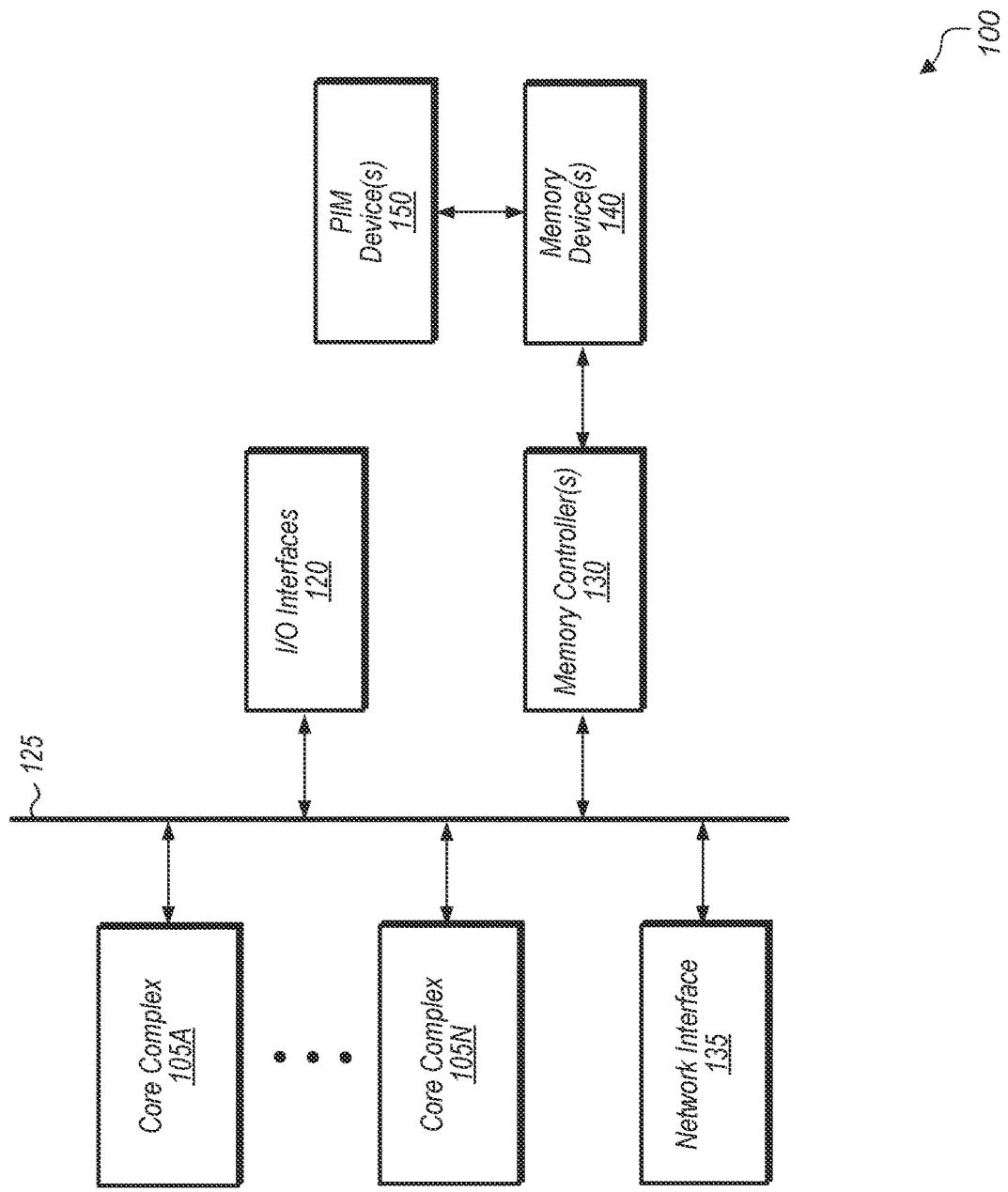
FIG. 1 is a block diagram of one implementation of a computing system.

Referring now to FIG. 1, a block diagram of one implementation of a computing system 100 is shown. In one implementation, computing system 100 includes at least core complexes 105A-N, input/output (I/O) interfaces 120, bus 125, memory controller(s) 130, network interface 135, memory device(s) 140, and processing-in-memory device(s) 150. In other implementations, computing system 100 can include other components and/or computing system 100 can be arranged differently. In one implementation, each core complex 105A-N includes one or more general purpose processors, such as central processing units (CPUs). It is noted that a "core complex" can also be referred to as a "processing node", a "CPU", a "processor", or an "accelerator" herein. In some implementations, one or more core complexes 105A-N can include a data parallel processor with a highly parallel architecture. Examples of data parallel processors include graphics processing units (GPUs), chiplet GPUs, digital signal processors (DSPs), field programmable gate arrays (FPGAs), application specific integrated circuits (ASICs), and so forth. Each processor core within core complex 105A-N includes a cache subsystem with one or more levels of caches. In one implementation, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices 140. Depending on the implementation, the type of memory in memory device(s) 140 coupled to memory controller(s) 130 can include Dynamic Random Access Memory (DRAM), Static Random Access Memory (SRAM), NAND Flash memory, NOR flash memory, Ferroelectric Random Access Memory (FeRAM), or other types. One or more of memory devices 140 include and/or are coupled to any number of processing-in-memory (PIM) devices 150 for performing processing operations close to or within memory devices 140. Incorporating PIM capabilities in or near the memory devices 140 can improve performance and energy efficiency for a range of compute workloads.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 can be a server, computer, laptop, mobile device, game console, streaming device, wearable device, or any of various other types of computing systems or devices. It is noted that the number of components of computing system 100 can vary from implementation to implementation. There can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
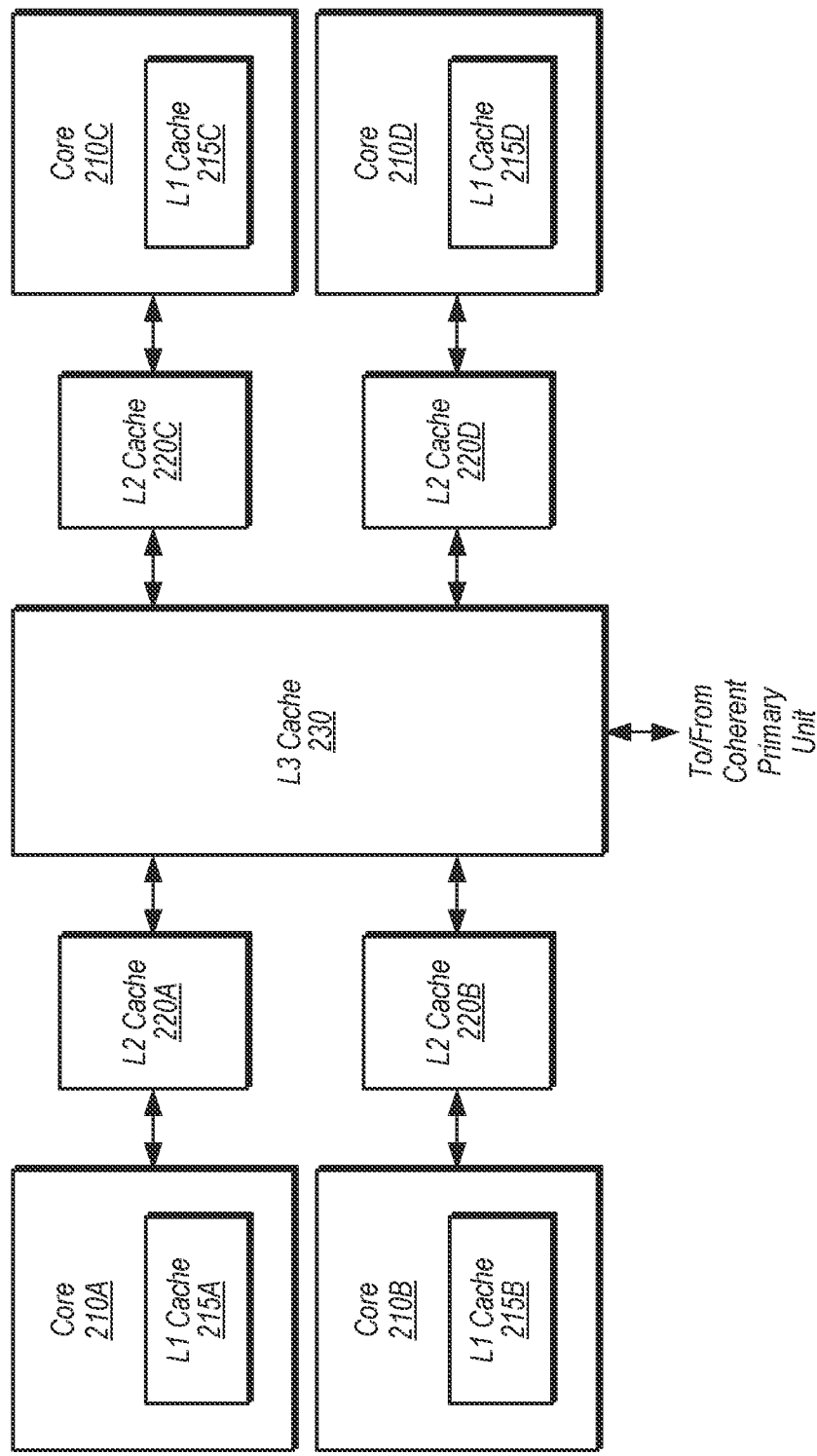
FIG. 2 is a block diagram of one implementation of a core complex.

Turning now to FIG. 2, a block diagram of one implementation of a core complex 200 is shown. In one implementation, core complex 200 includes four processor cores 210A-D. In other implementations, core complex 200 can include other numbers of processor cores. It is noted that a "core complex" can also be referred to as a "processing node", "accelerator", "processor", or "CPU" herein. In one implementation, the components of core complex 200 are included within core complexes 105A-N (of FIG. 1).

Each processor core 210A-D includes a cache subsystem for storing data and instructions retrieved from the memory subsystem (not shown). For example, in one implementation, each core 210A-D includes a corresponding level one (L1) cache 215A-D. Each processor core 210A-D can include or be coupled to a corresponding level two (L2) cache 220A-D. Additionally, in one implementation, core complex 200 includes a level three (L3) cache 230 which is shared by the processor cores 210A-D. L3 cache 230 is coupled to a coherent primary unit for access to the fabric and memory subsystem. It is noted that in other implementations, core complex 200 can include other types of cache subsystems with other numbers of cache and/or with other configurations of the different cache levels.

Figure 3:
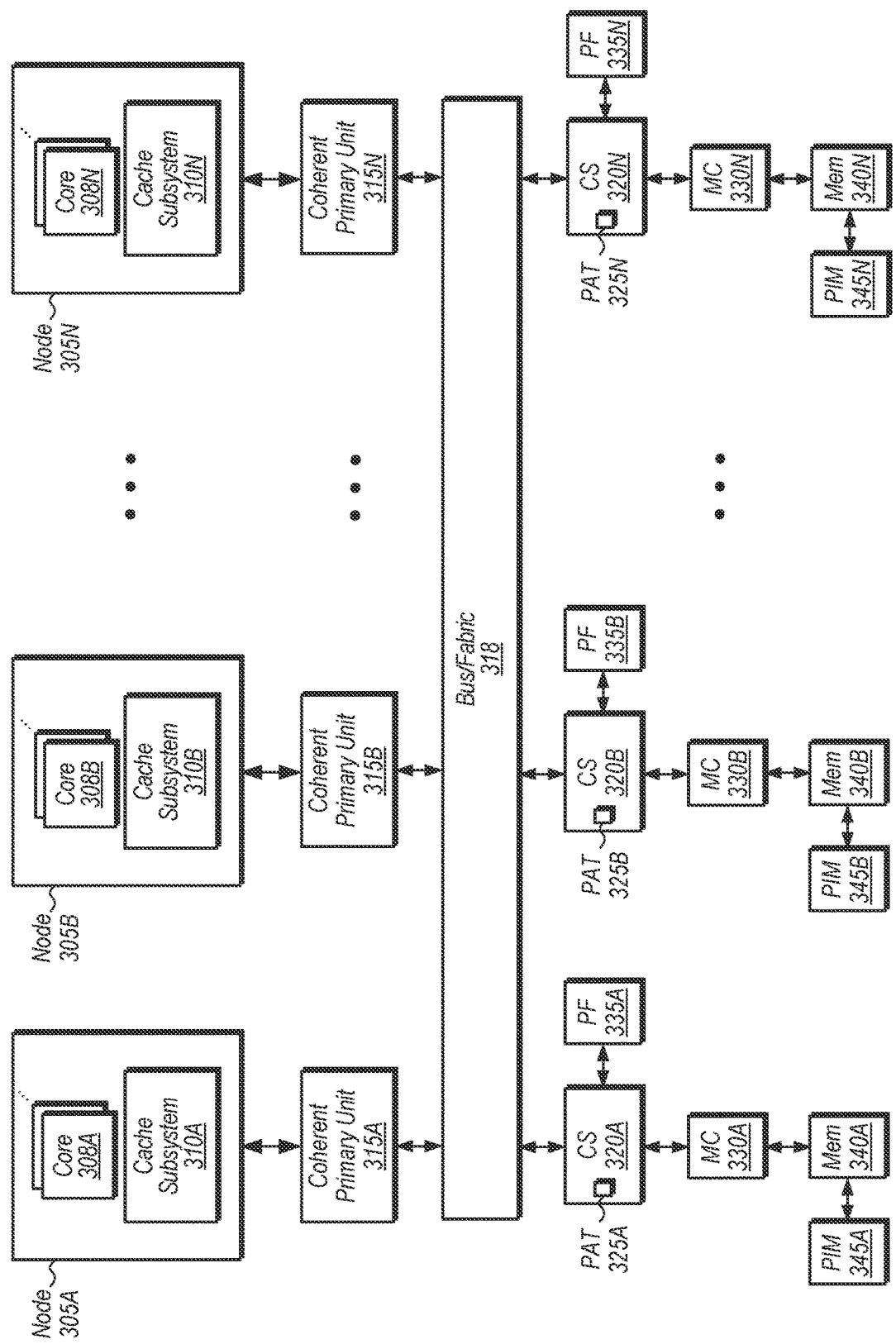
FIG. 3 is a block diagram of another implementation of a multi-node system.

Referring now to FIG. 3, a block diagram of one implementation of a multi-node system 300 is shown. As shown, system 300 includes multiple nodes 305A-N, with the number of nodes per system varying from implementation to implementation. Each node 305A-N can include any number of cores 308A-N, respectively, with the number of cores varying according to the implementation and from node to node. Each node 305A-N also includes a corresponding cache subsystem 310A-N. Each cache subsystem 310A-N can include any number of cache levels and any type of cache hierarchical structure.

In one implementation, each node 305A-N is connected to a corresponding coherent primary unit 315A-N. As used herein, a "coherent primary unit" is defined as an agent that processes traffic flowing over an interconnect (e.g., bus/fabric 318) and manages coherency for a connected node. To manage coherency, a coherent primary unit receives and processes coherency-related messages and probes and generates coherency-related requests and probes.

In one implementation, each node 305A-N is coupled to a corresponding coherent secondary (CS) unit 320A-N via a corresponding coherent primary unit 315A-N and bus/fabric 318. For example, node 305A is coupled through coherent primary unit 315A and bus/fabric 318 to coherent secondary unit 320A. Coherent secondary unit 320A is coupled to memory 340A via memory controller (MC) 330A. Memory 340A is coupled to or includes processing-in-memory (PIM) device 345A to perform computations and/or processing operations close to or within memory 340A. Coherent secondary unit 320A is also coupled to or includes processing-in-memory address table (PAT) 325A and probe filter (PF) 335A, with probe filter 335A including entries for cache lines cached in system 300 for the memory 340A accessible through memory controller 330A. PAT 325A tracks the addresses of recent PIM requests for which all necessary probes have been issued. Generally speaking, PAT 325A acts as a pre-filter which can be accessed prior to a lookup of PF 330A for a given processing-in-memory (PIM) request. PAT 325A leverages the nature of PIM operations (that can touch many memory locations via a single request) to filter at a coarser granularity than a cache line.

When the first PIM request to a given address arrives at CS 320A, an entry is created in PAT 325A, and subsequent requests to the same address can safely skip accessing the probe filter 335A. It is noted that probe filter 335A, and each of the other probe filters, can also be referred to as a "cache directory". Also, PAT 325A, and each of the other PATs, can also be referred to as a "pre-filter". It is also noted that the example of having one memory controller per node is merely indicative of one implementation. It should be understood that in other implementations, each node 305A-N can be connected to other numbers of memory controllers.

In a similar configuration to that of node 305A, node 305B is coupled to coherent secondary unit 320B via coherent primary unit 315B and bus/fabric 318. Coherent secondary unit 320B is coupled to memory 340B via memory controller 330B, and coherent secondary unit 320B is also coupled to or includes PAT 325B and probe filter 335B to manage the coherency of cache lines corresponding to memory 340B. Memory 340B is coupled to or includes PIM device 345B to perform computations and/or processing operations close to or within memory 340B. Similarly, node 305N is coupled to coherent secondary units 320N via coherent primary unit 315N and bus/fabric 318. Coherent secondary unit 320N is coupled to or includes PAT 325N and probe filter 335N for coherency purposes, and coherent secondary unit 320N is coupled to memory 340N and PIM device 345N via memory controllers 330N. While system 300 includes PIM devices 345A-N, other implementations can utilize near-memory processing devices in a similar fashion to PIM devices 345A-N. As used herein, a "coherent secondary unit" is defined as an agent that manages coherency by processing received requests and probes that target a corresponding memory controller. Additionally, as used herein, a "probe" is defined as a message passed from a coherency point to one or more caches in the computer system 300 to determine if the caches have a copy of a block of data and optionally to indicate the state into which the cache should place the block of data and/or trigger a write-back of dirty data in the cache.

In order to provide sufficient PIM instruction bandwidth, a single PIM request sent from the host node to memory can target multiple DRAM banks within a channel (e.g., 16 banks). Thus, a single PIM request touches data from multiple cache lines. Before a PIM request can execute in memory, the system must ensure that any data that will be touched by the PIM request but which already resides in a processor cache is written back to memory. When a cache-coherent PIM request is processed at the coherent secondary unit, the PIM request accesses the probe filter multiple times and sends out multiple invalidating probes. When the coherent secondary unit receives a stream of PIM requests to the same address or group of addresses, the first PIM request will trigger probes that invalidate any matching lines in the probe filter. For each following PIM request, the probe filter accesses are guaranteed to miss. Given the performance and power overhead of these unnecessary probe filter accesses, it would be beneficial to avoid them altogether for all but the first PIM request to a given address or set of addresses. Accordingly, each PAT 325A-N acts as a pre-filter to reduce the number of PIM requests sent to the corresponding probe filter 335A-N. If there is an entry in the PAT for a given PIM request, then an expensive probe filter lookup can be skipped for the given PIM request.

Figure 4:
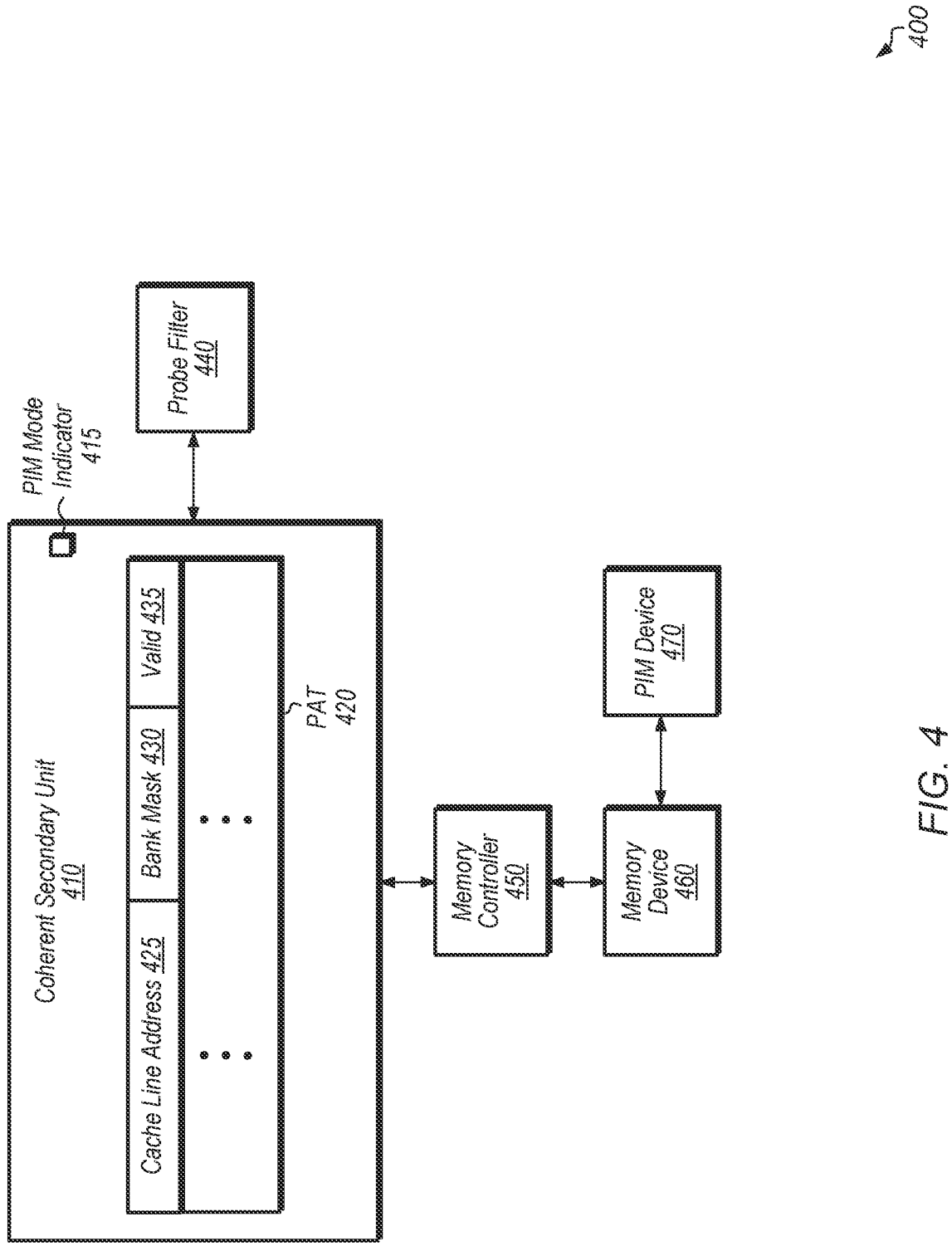
FIG. 4 is a block diagram of one implementation of an apparatus with a coherent secondary unit.

Turning now to FIG. 4, a block diagram of one implementation of an apparatus 400 with a coherent secondary unit 410 is shown. Coherent secondary unit 410 is coupled to probe filter 440 and memory controller 450. Memory controller 450 manages accesses to memory device 460. PIM device 470 is coupled to or incorporated within memory device 460 for executing instructions and/or performing operations on data stored in memory device 460. Coherent secondary unit 410 includes a PIM address table (PAT) 420 for reducing the amount of traffic to probe filter 440. In one implementation, each entry of PAT 420 includes a cache line address field 425, bank mask field 430, and a valid field 435. In other implementations, the entries of PAT 420 can include other fields.

In one implementation, PAT 420 tracks the physical addresses of recent PIM requests for which probes have already been issued by probe filter 440. A valid entry in PAT 420 indicates that an incoming PIM request matching that address does not need to issue any probes and therefore can safely skip accessing probe filter 440. If a PIM request does not match any addresses in PAT 420, the PIM request will then access probe filter 440. When the PIM request accesses probe filter 440, a new entry for the PIM request is created in PAT 420. In cases where apparatus 400 executes both PIM and non-PIM requests, any non-PIM request which results in an entry being installed in probe filter 440 will cause any matching entry in PAT 420 to be stale. For example, when a new entry is added to probe filter 440 by a non-PIM request, PAT 420 will be searched for any entries matching the address of the non-PIM request. Any matching entries in PAT 420 will then be invalidated.

In one implementation, a synchronization action (e.g., barrier instruction) is inserted in between PIM and non-PIM accesses to the same data. When the synchronization action reaches probe filter 440, a bulk PAT invalidation is triggered in one implementation. In another implementation, any non-PIM request that installs an entry in probe filter 440 will index into PAT 420 using the physical address and invalidate any matching entry. The lookup to PAT 420 can occur at the same time as the installation of the entry into probe filter 440, or the lookup to PAT 420 can be delayed for batching or coalescing purposes as long as the lookup to PAT 420 occurs before the next PIM request accesses PAT 420. Alternatively, if the coherent secondary unit switches between processing PIM and non-PIM requests at a coarse granularity, a bulk PAT invalidation action may be implicitly triggered whenever the request stream switches from PIM to non-PIM requests.

In a further implementation, a hybrid coarse-grained and fine-grained solution is employed for performing invalidations of PAT 420. In this implementation, fine-grained invalidations of PAT 420 are used when PIM requests meet a given frequency threshold. When PIM request frequency falls below the threshold, PAT 420 can be disabled, forcing all PIM requests to perform probes, and avoiding lookups and invalidations of PAT 420 for non-PIM requests.

In one implementation, coherent secondary unit 410 takes into account bank targets of PIM requests. For example, in this implementation, the entries of PAT 420 include a bank mask field 430 to indicate which banks are targeted by a corresponding PIM request. The total number of banks which a PIM request could potentially target can vary from implementation to implementation based on structure of the target memory device 460. In one implementation, coherent secondary unit 410 prevents probes from being generated for any individual addresses that map to banks for which the corresponding bank mask bit is set in a matching entry of PAT 420 for a given PIM request. This allows coherent secondary unit 410 to use the bank mask field 430 to reduce the number of probe filter 440 accesses and probes required for a given PIM request.

When a new entry is created in PAT 420, the bank mask field 430 is populated based on the bank mask of the corresponding request. In one implementation, when a PIM request performs a lookup to PAT 420, the PIM request is only considered a hit if all of the bits in the request's bank mask are also set in the matching PAT entry's bank mask field 430. In the case where a PAT entry for the address already exists but the request's bank mask is not a subset of the entry's bank mask field 430, an access to probe filter 440 would still be performed for the request. In this case, the entry's bank mask field 430 would be updated to the bitwise OR of the request's bank mask and the entry's bank mask field 430. In one implementation, a non-PIM request installing an entry in probe filter 440 would result in clearing only the matching bank bits in bank mask field 430 of the corresponding entry of PAT 420.

In one implementation, only PIM requests that target all banks access PAT 420. In this implementation, requests that target a subset of the banks forgo inserting entries into and performing lookups of PAT 420. In another implementation, only PIM requests that target more than a threshold number of banks access PAT 420. The threshold number can vary according to the implementation.

In one implementation, PAT 420 is not accessed if PAT 420 contains no valid entries. In a program which does not execute PIM instructions, PAT 420 will be empty. Additionally, even when a program includes PIM instructions, PAT 420 can reach a state with no valid entries after matching non-PIM requests have invalidated all of the entries in PAT 420. In another implementation, PAT 420 is automatically disabled after no PIM requests have been received for a specific number of cycles. In this implementation, PAT 420 can be explicitly disabled or all entries in PAT 420 can be invalidated.

In one implementation, a PIM consistency model can be defined such that PIM requests and non-PIM requests are guaranteed not to race. In this implementation, if conflicting PIM and non-PIM requests are required to be separated by a synchronization operation, then non-PIM requests would no longer be required to invalidate entries in PAT 420. Instead, coherent secondary unit 410 would simply flush PAT 420 when a synchronization operation is received.

In one implementation, a PIM mode indicator 415 is added to coherent secondary unit 410. In this implementation, when PIM mode gets activated, PAT 420 is cleared. When PIM mode gets deactivated, PAT 420 is disabled. The use of PIM mode indicator 415 allows software executing on one or more nodes (e.g., nodes 305A-N of FIG. 3) of the system to explicitly enable and disable PIM mode.

A common access pattern for PIM applications is to issue multiple PIM requests to the same address before proceeding to the next address. The number of PIM requests sent to the same address is defined as the burst length. For a burst length of N, where "N" is a positive integer, the use of PAT 420 will allow coherent secondary unit 410 to avoid (N−1)/N of the PIM probe filter 440 lookups. For example, for a burst length of 5, the use of PAT 420 will avoid 80% of the probe filter 440 lookups.

In one implementation, PIM requests operate on a first granularity while coherence is tracked at a second granularity different from the first granularity. In one implementation, the first granularity is 32 Bytes (B) while the second granularity is 64 B. In other implementations, the first and second granularities can have other values. In the implementation where the first granularity is 32 B and the second granularity is 64 B, if a PIM application has a simple strided access pattern with the minimum stride size (32 B), this effectively doubles the observed burst length since the bursts of requests to addresses A and A+32 will map to the same set of cache lines. For such an application, a burst length of 5 will allow PAT 420 to avoid 90% of the PIM lookups to probe filter 440.

The size of PAT 420 can vary according to the implementation. Due to the inherent locality in PIM request streams, a relatively small number of entries should be sufficient to obtain most of the benefits of a relatively large PAT for many applications. Since PAT 420 has a finite capacity, there may not be a free entry available when a PIM request needs to allocate a new entry. The resiliency of the PAT approach allows for an entry in PAT 420 to be invalidated at any time without impacting program correctness.

Accordingly, any standard cache eviction policy can be employed for PAT 420, such as pseudo-least recently used (LRU), random, or other policy. In some scenarios, PAT 420 can be implemented as a circular buffer, with a pointer that points to the buffer location where the next entry will be allocated. In these scenarios, the pointer is incremented in response to a new entry being allocated. This results in a least-recently allocated eviction policy. In other scenarios, PAT 420 can be implemented using any of various other suitable structures and/or eviction policies.

Figure 5:
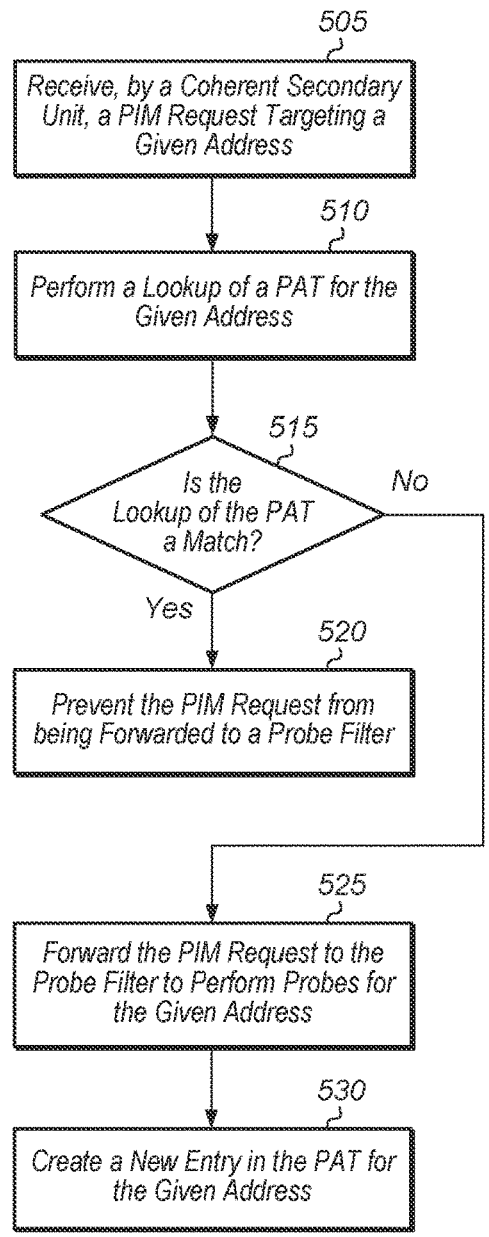
FIG. 5 is a generalized flow diagram illustrating one implementation of a method for reducing coherency probes generated for PIM requests.
Figure 6:
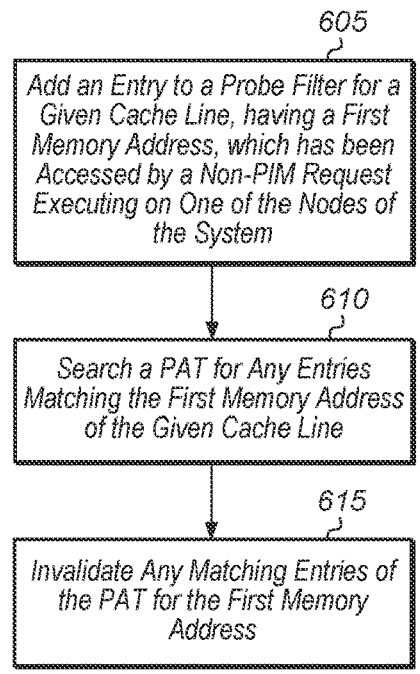
FIG. 6 is a generalized flow diagram illustrating one implementation of a method for invalidating entries of a PIM address table (PAT).
Figure 7:
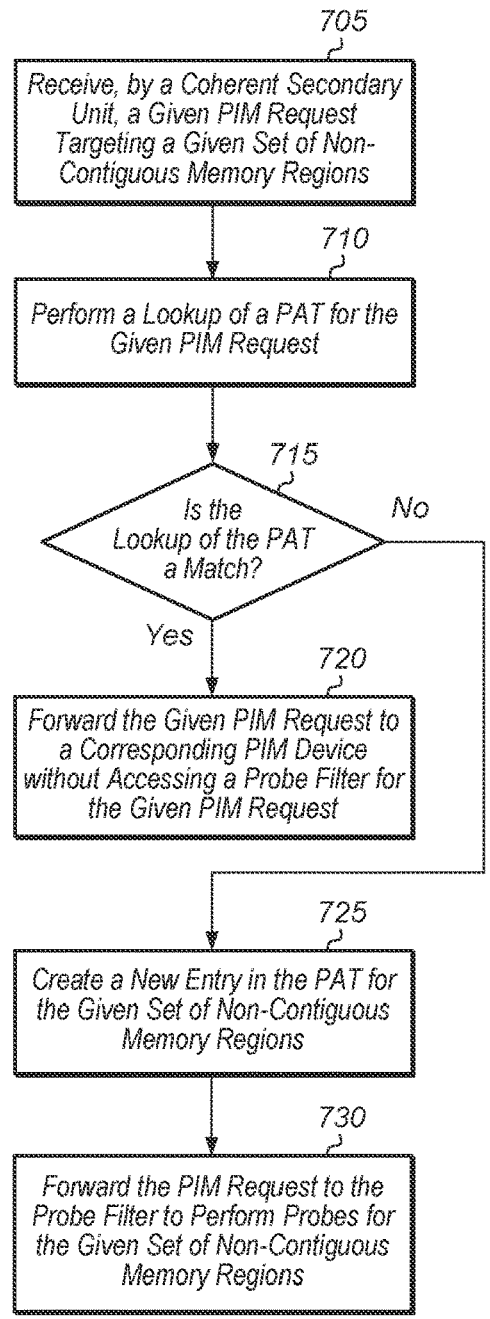
FIG. 7 is a generalized flow diagram illustrating one implementation of a method for maintaining a PIM address table (PAT) with entries for different sets of non-contiguous memory regions.
Figure 9:
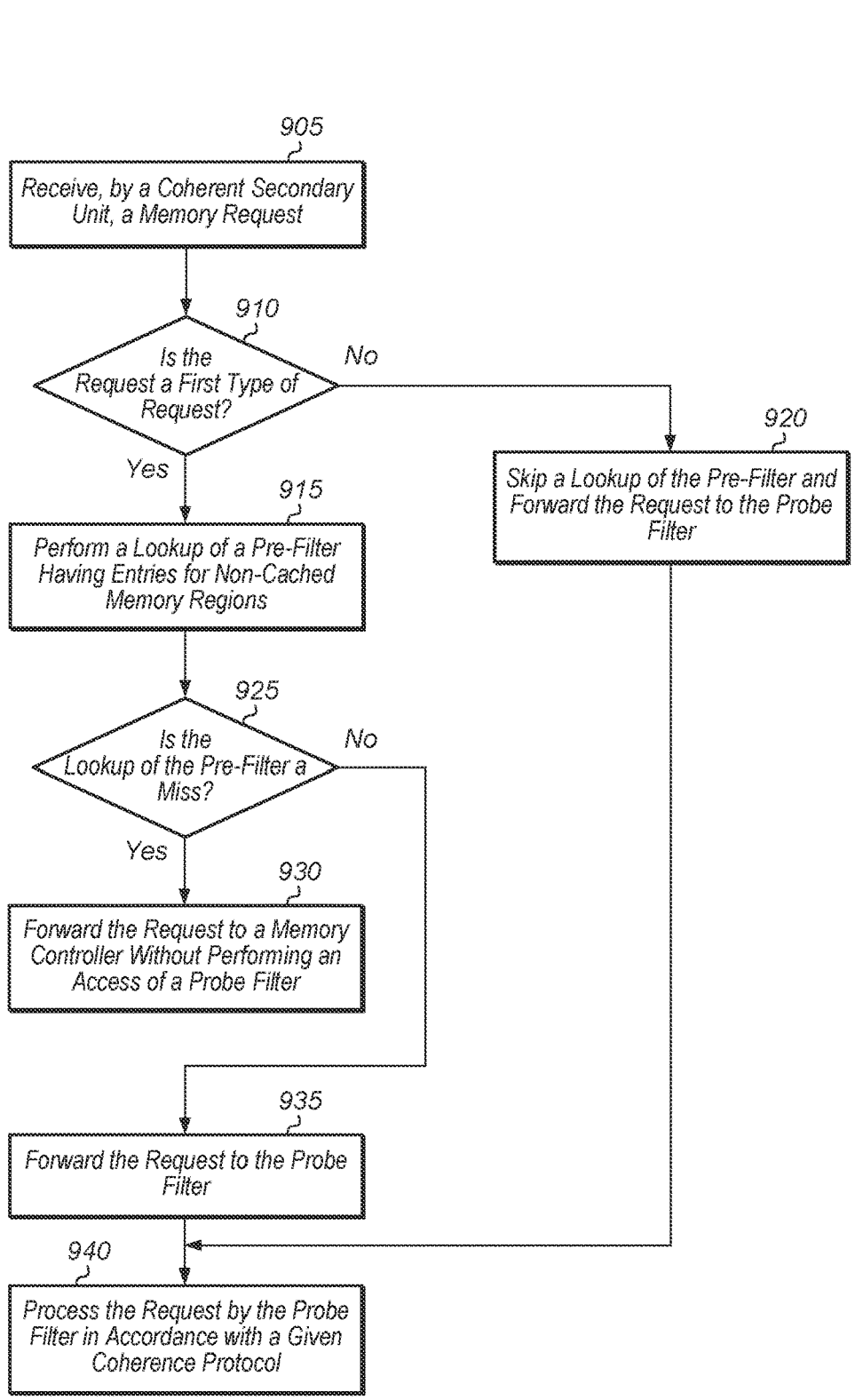
FIG. 9 is a generalized flow diagram illustrating one implementation of a method for employing a pre-filter in combination with a probe filter.

Turning now to FIG. 5, one implementation of a method 500 for reducing coherency probes generated for PIM requests is shown. For purposes of discussion, the steps in this implementation and those of FIGS. 6, 7, and 9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500 (and methods 600, 700, and 900).

A coherent secondary unit receives a PIM request targeting a given address (block 505). In response to receiving the PIM request, the coherent secondary unit performs a lookup of a PIM address table (PAT) for the given address (block 510). If the lookup of the PAT is a match for the given address (conditional block 515, "yes" leg), then the coherent secondary unit prevents the PIM request from being forwarded to a probe filter (block 520). After block 520, method 500 ends. If there is a matching entry for the given address in the PAT, this means probes have already been sent out for the given address and any related addresses, and new probes are unnecessary. This helps to reduce the probe traffic that is generated for PIM requests.

Otherwise, if the lookup of the PIM address table is a miss for the given address (conditional block 515, "no" leg), then the coherent secondary unit forwards the PIM request to the probe filter to perform probes for the given address (block 525). Also, the coherent secondary unit creates a new entry in the PAT for the given address (block 530). Any subsequent PIM requests to the given address will then hit on this new entry and not generate probe filter accesses as a result, helping to reduce the amount of probe filter traffic. After block 530, method 500 ends.

Turning now to FIG. 6, one implementation of a method 600 for invalidating entries of a PIM address table (PAT) is shown. An entry is added to a probe filter for a given cache line, having a first memory address, which has been accessed by a non-PIM request executing on one of the nodes of the system (block 605). Next, in response to adding the entry to the probe filter for the given cache line, the PAT is searched for any entries matching the first memory address of the given cache line (block 610). Then, any matching entries of the PAT for the first memory address are invalidated (block 615). After block 615, method 600 ends.

Referring now to FIG. 7, one implementation of a method 700 for maintaining a PIM address table (PAT) with entries for different sets of non-contiguous memory regions is shown. A given PIM request targeting a given set of non-contiguous memory regions is received by a coherent secondary unit (block 705). In one implementation, the non-contiguous access pattern of the given PIM request is predetermined. In another implementation, a mapping of the non-contiguous access pattern is sent along with the given PIM request and stored by the PIM address table (PAT) and/or probe filter to indicate which regions are targeted by the given PIM request. For example, the access pattern can be a strided access pattern to non-contiguous regions separated by a particular stride. In other cases, other types of access patterns can be utilized by the given PIM request.

A lookup of a PAT is performed for the given PIM request (block 710). If a matching entry is found (conditional block 715, "yes" leg), then the given PIM request is forwarded to a corresponding PIM device without accessing a probe filter for the given PIM request (block 720). By not accessing the probe filter for the given PIM request, unnecessary probe traffic is reduced. After block 720, method 700 ends. If a matching entry is not found (conditional block 715, "no" leg), then a new entry is created in the PAT for the given set of non-contiguous memory regions (block 725). Also, the given PIM request is forwarded to the probe filter to perform probes for the given set of non-contiguous memory regions (block 730). In one implementation, in contrast to the PAT, the probe filter tracks contiguous memory regions. After block 730, method 700 ends.

Figure 8:
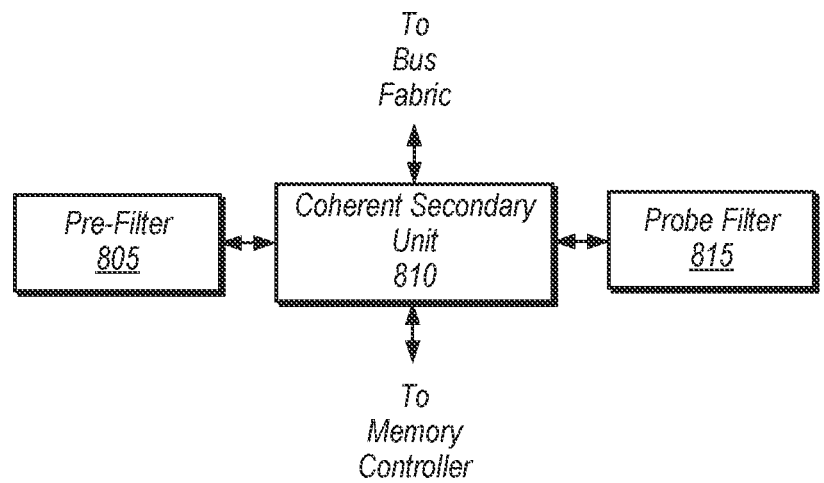
FIG. 8 is a block diagram of one implementation of coherency circuitry.

Turning now to FIG. 8, a block diagram of one implementation of coherency circuitry 800 is shown. In one implementation, coherency circuitry 800 includes at least pre-filter 805, coherent secondary unit 810, and probe filter 815. In other implementations, coherency circuitry 800 includes other components arranged in other suitable structures. Coherent secondary unit 810 is coupled to at least pre-filter 805, probe filter 815, one or more memory controllers (not shown), and a bus fabric (not shown). It is noted that pre-filter 805 can also be referred to as PIM address table 805 in at least one implementation.

When coherent secondary unit 810 receives a request targeting a given range of memory addresses, coherent secondary unit 810 determines whether to access pre-filter 805 and/or probe filter 815 based on the type of request. In one implementation, if the request is a first type of request, coherent secondary unit 810 performs a lookup of pre-filter 805. In one implementation, pre-filter 805 includes entries for regions of memory that are not cached by other nodes in the system. If there is not an entry in pre-filter 805 for the first type of request, then coherent secondary unit 810 forwards the request to probe filter 815 to determine if the targeted data is cached by any other nodes in the system. If the request is a second type of request, coherent secondary unit 810 does not perform a lookup of pre-filter 805 and forwards the second type of request to probe filter 815.

It is assumed for the purposes of this implementation that the second type of request is different from the first type of request. In one implementation, the first type of request is a PIM request and the second type of request is a non-PIM request. In another implementation, the first type of request is a request that targets more than or equal to a threshold number of memory banks while the second type of request is a request that targets less than the threshold number of memory banks. In other implementations, the first and second types of request are other types of requests. Generally speaking, pre-filter 805 helps to prevent expensive lookups of probe filter 815 and prevent unnecessary probe traffic for requests that target data not cached by other nodes. Pre-filter 805 increases the efficiency for workloads with access patterns having a high level of temporal locality.

Referring now to FIG. 9, one implementation of a method 900 for employing a pre-filter in combination with a probe filter is shown. A memory request is received by a coherent secondary unit (block 905). If the request is a first type of request (conditional block 910, "yes" leg), then a lookup is performed of a pre-filter having entries for non-cached memory regions (block 915). In other words, the pre-filter includes entries for data that is not cached anywhere else in the system. In one implementation, the first type of request is a PIM request, while in other implementations, the first type of request corresponds to other types of requests. If the lookup of the pre-filter is a miss (conditional block 925, "yes" leg), then the request is forwarded to the memory controller without performing an access of a probe filter (block 930). After block 930, method 900 ends. Otherwise, if the lookup of the pre-filter is a hit (conditional block 925, "no" leg), then the request is forwarded to the probe filter (block 935). The request is then processed by the probe filter in accordance with a given coherence protocol (block 940). After block 940, method 900 ends. If the request is different from the first type of request (conditional block 910, "no" leg), then a lookup of the pre-filter is skipped and the request is forwarded to the probe filter (block 920).

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a probe filter configured to enforce cache coherency for a given memory range;
   a processing-in-memory (PIM) address table (PAT) comprising a plurality of entries with each entry being configured to store:
      an address of a PIM request for which probes have been issued; and
      a bank mask that indicates which banks of a plurality of banks of a memory device have been targeted by one or more PIM requests, each comprising a corresponding bank mask field; and
   a circuit configured to:
      perform a lookup of the PAT, responsive to receiving a first PIM request;
      responsive to the lookup of the PAT being a miss:
         create a first entry in the PAT for the first PIM request; and
         send the first PIM request to the probe filter; and responsive to the lookup of the PAT being a hit, send the first PIM request to a PIM device and not the probe filter.

2. The apparatus as recited in claim 1, wherein responsive to receiving the first PIM request, the probe filter is configured to send a plurality of probes to one or more cache subsystems to determine if any cache lines targeted by the first PIM request are cached by the one or more cache subsystems.

3. The apparatus as recited in claim 1, wherein responsive to a first non-PIM request allocating an entry in the probe filter, the circuit is configured to:
search the PAT for entries corresponding to a first address of the first non-PIM request; and
invalidate an entry in the PAT which corresponds to the first address of the first non-PIM request.

4. The apparatus as recited in claim 1, wherein the first PIM request indicates a computation to be performed in memory.

5. The apparatus as recited in claim 1, wherein the circuit is further configured to:
perform the lookup of the PAT by indexing into the PAT using an address of the first PIM request; and
generate an indication that the lookup of the PAT is a miss for a given entry of the plurality of entries, responsive to the address of the first PIM request matching the address of the given entry and one or more bits that indicate banks being targeted of the bank mask field of the first PIM request not having corresponding bits of the bank mask field of the given entry indicating banks have been targeted.

6. The apparatus as recited in claim 1, wherein the circuit is further configured to disable the PAT, responsive to an indication that a PIM mode is deactivated, wherein the PIM mode indicates PIM requests and non-PIM requests are required to be separated by a synchronization operation.

7. The apparatus as recited in claim 1, wherein the first entry in the PAT for the first PIM request corresponds to a first set of non-contiguous memory regions.

8. A method comprising:
storing, by circuitry in entries of a processing-in-memory (PIM) address table (PAT):
an address of a processing-in-memory (PIM) request for which probes have been issued; and
a bank mask that indicates which banks of a plurality of banks of a memory device have been targeted by one or more PIM requests, each comprising a corresponding bank mask field;
performing, by a circuit, a lookup of the PAT responsive to receiving a first PIM request;
responsive to the lookup of the PAT being a miss:
creating a first entry in the PAT for the first PIM request; and
sending the first PIM request to a probe filter configured to enforce cache coherency for a given memory range; and
responsive to the lookup of the PAT being a hit, sending the first PIM request to a PIM device and not the probe filter.

9. The method as recited in claim 8, further comprising the probe filter sending a plurality of probes to one or more cache subsystems to determine if any cache lines targeted by the first PIM request are cached by the one or more cache subsystems, responsive to receiving the first PIM request.

10. The method as recited in claim 8, wherein responsive to a first non-PIM request allocating an entry in the probe filter, the method further comprising:
searching the PAT for entries corresponding to a first address of the first non-PIM request; and
invalidating an entry in the PAT which corresponds to the first address of the first non-PIM request.

11. The method as recited in claim 8, wherein the first PIM request indicates a computation to be performed in memory.

12. The method as recited in claim 8, further comprising generating an indication that the lookup of the PAT is a miss for a given entry of a plurality of entries of the PAT, responsive to the address of the first PIM request matching the address of the given entry and one or more bits that indicate banks being targeted of the bank mask of the first PIM request not having corresponding bits of the bank mask of the given entry indicating banks have been targeted.

13. The method as recited in claim 8, further comprising disabling the PAT, responsive to an indication that a PIM mode is deactivated, wherein the PIM mode indicates PIM requests and non-PIM requests are required to be separated by a synchronization operation.

14. The method as recited in claim 8, wherein the first entry in the PAT for the first PIM request corresponds to a first set of non-contiguous memory regions.

15. A system comprising:
a processing-in-memory (PIM) device; and
a circuit configured to:
perform a lookup of PIM address table (PAT) responsive to receiving a first processing-in-memory (PIM) request by indexing into the PAT using an address and a bank mask received with the first PIM request, wherein the PAT comprises a plurality of entries, each of the plurality of entries comprising circuitry configured to store:
an address of a PIM request for which probes have been issued; and
a bank mask that indicates which banks of a plurality of banks of a memory device have been targeted by one or more PIM requests, each comprising a corresponding bank mask field;
responsive to the lookup of the PAT being a miss:
create a first entry in the PAT for the first PIM request; and
send the first PIM request to a probe filter configured to enforce cache coherency for a given memory range; and
responsive to the lookup of the PAT being a hit, send the first PIM request to the PIM device and not the probe filter.

16. The system as recited in claim 15, wherein responsive to receiving the first PIM request, the circuit is configured to send a plurality of probes to one or more cache subsystems to determine if any cache lines targeted by the first PIM request are cached by the one or more cache subsystems.

17. The system as recited in claim 15, wherein responsive to a first non-PIM request allocating an entry in the probe filter, the circuit is configured to:
search the PAT for entries corresponding to a first address of the first non-PIM request; and
invalidate an entry in the PAT which corresponds to the first address of the first non-PIM request.

18. The system as recited in claim 15, wherein the first PIM request indicates a computation to be performed in memory.

19. The system as recited in claim 15, wherein the circuit is further configured to generate an indication that the lookup of the PAT is a miss for a given entry of the plurality of entries, responsive to the address of the first PIM request matching the address of the given entry and one or more bits that indicate banks being targeted of the bank mask of the first PIM request not having corresponding bits of the bank mask field of the given entry indicating banks have been targeted.

20. The system as recited in claim 15, wherein the circuit is further configured to disable the PAT, responsive to an indication that a PIM mode is deactivated.

* * * * *